United States Patent [19]
Kawai et al.

[11] Patent Number: 6,025,892
[45] Date of Patent: Feb. 15, 2000

[54] ACTIVE MATRIX SUBSTRATE WITH REMOVAL OF PORTION OF INSULATING FILM OVERLAPPING SOURCE LINE AND PIXEL ELECTRODE AND METHOD FOR PRODUCING THE SAME

[75] Inventors: Katsuhiro Kawai, Yamatotakada; Shinya Yamakawa, Ikoma; Masaya Okamoto, Soraku-gun; Mikio Katayama, Ikoma, all of Japan

[73] Assignee: Sharp Kabushiki Kaisha, Osaka, Japan

[21] Appl. No.: 08/839,268

[22] Filed: Apr. 17, 1997

[30] Foreign Application Priority Data

Apr. 22, 1996 [JP] Japan ................................ 8-100074
Mar. 7, 1997 [JP] Japan ................................ 9-053085

[51] Int. Cl.[7] .................................................. G02F 1/136
[52] U.S. Cl. ........................... 349/43; 349/42; 349/39; 349/192; 438/30; 438/937
[58] Field of Search ..................... 438/937, 30; 349/42, 349/43, 192, 39

[56] References Cited

U.S. PATENT DOCUMENTS

| | | | |
|---|---|---|---|
| 5,054,887 | 10/1991 | Kato et al. ................................ | 349/39 |
| 5,056,895 | 10/1991 | Kahn ......................................... | 359/87 |
| 5,084,905 | 1/1992 | Sasaki et al. ............................. | 357/71 |
| 5,523,866 | 6/1996 | Morimoto et al. ........................ | 349/43 |
| 5,721,601 | 2/1998 | Yamaji et al. ........................... | 349/138 |

FOREIGN PATENT DOCUMENTS 7-113729  12/1995  Japan .

*Primary Examiner*—William L. Sikes
*Assistant Examiner*—Julie Ngo
*Attorney, Agent, or Firm*—Nixon & Vanderhye, P.C.

[57] ABSTRACT

An active matrix substrate of the present invention includes: a substrate; a plurality of first lines formed on the substrate to be parallel to each other; an insulating film covering the first lines; a plurality of second lines formed on the substrate extending to cross the first lines with the insulating film interposed therebetween; a plurality of switching elements provided near respective crossings of the first lines and the second lines; and a plurality of pixel electrodes which are arranged in a matrix on the insulating film and which are connected to the switching elements, respectively. The insulating film is partially removed prior to forming the second lines and the pixel electrodes so that the removed portions of the insulating film correspond to the gaps.

28 Claims, 13 Drawing Sheets

ACTIVE MATRIX SUBSTRATE WITH REMOVAL OF PORTION OF INSULATING FILM OVERLAPPING SOURCE LINE AND PIXEL ELECTRODE AND METHOD FOR PRODUCING THE SAME

BACKGROUND OF THE INVENTION

1. Field of the Invention

The present invention relates to an active matrix substrate incorporated in a liquid crystal panel and a method for producing the same.

2. Description of the Related Art

FIG. 16 is a circuit diagram showing a structure of a conventional active matrix liquid crystal display device.

Referring to FIG. 16, the conventional active matrix liquid crystal display device includes a plurality of gate lines 1 arranged in parallel to each other, a plurality of source lines 2 arranged in parallel to each other, a plurality of pixels 3 provided in a matrix and a common electrode 4. The gate lines 1 serving as scanning lines extend along rows of the pixels 3 so as to respectively correspond to the rows, while the source lines 2 serving as data lines extend along columns of the pixels 3 so as to respectively correspond to the columns. Therefore, the gate lines 1 and the source lines 2 cross each other to enclose a plurality of regions arranged in a matrix. Each of the pixels 3 is provided in each of the enclosed regions and is mainly composed of a pixel electrode 5 and a switching element 6, i.e., a thin film transistor (TFT). The switching element 6 is connected to a corresponding gate line 1 and a corresponding source line 2. Furthermore, the active matrix liquid crystal display device includes lead terminals 7 and 8 which connect the gate lines 1 and the source lines 2 to respective drivers.

Although not illustrated, a liquid crystal panel of such a liquid crystal display device usually includes a pair of substrates opposed to each other with a gap therebetween, the gap being filled with a liquid crystal material. One of the pair of substrates is referred to as an active matrix substrate which is provided with the above-mentioned gate lines 1, source lines 2 and pixels 3. The other substrate is referred to as a counter substrate which is provided with the above-mentioned common electrode 4. Furthermore, the counter substrate may be optionally provided with an RGB or a YMC color filter.

FIG. 17 is a plan view showing a one-pixel portion of an exemplary active matrix substrate 10. FIG. 18 is a cross-sectional view taken along line XVIII—XVIII of FIG. 17. FIG. 19 is a cross-sectional view taken along line XIX—XIX of FIG. 17.

The active matrix substrate 10 includes the pixel electrodes 5 which are respectively provided in pixel regions enclosed by the gate lines 1 and the source lines 2. In each pixel region, the switching element (TFT) 6 having a reversed staggered structure is also provided. As shown in FIG. 18, both of the pixel electrode 5 and the switching element 6 are formed on a transparent insulating substrate 11. Referring to FIG. 18, the switching element 6 includes a gate electrode 12, a gate insulating film 13, a semiconductor layer 14, a channel protection layer 15, a source electrode 16, a drain electrode 17, a first contact layer 18 and a second contact layer 19. The gate electrode 12, the source electrode 6 and the drain electrode 17 are connected to the gate line 1, the source line 2 and the pixel electrode 5, respectively.

As shown in FIGS. 18 and 19, the gate electrode 12 and the gate line 1 are provided beneath the gate insulating film 13 while the pixel electrode 5 and the source line 2 are provided above the gate insulating film 13. The active matrix substrate 10 having such a structure suffers from the following problems.

First, the source line 2 and the pixel electrode 5 provided above the gate insulating film 13 may be short-circuited with each other. Thus, short-circuit is caused by a conductive material piece existing between the source line 2 and the pixel electrode 5 so as to establish an electrical connection therebetween, resulting in a display defect. The conductive material piece is formed, for example, due to a patterning imperfection during a step of forming the source lines 2 and the pixel electrodes 5. In another case, the conductive material piece may be an etching residue or a reaction product which is left between the source line 2 and the pixel electrode 5 after formation the semiconductor layer 14 and the contact layers 18 and 19 is completed. The above-mentioned structural defect, i.e., the short-circuit, can be repaired by examining the active matrix substrate 10 after completing the whole production process so as to locate the structural defect, and laser radiating to the located structural defect. However, this radiation may spatter conductive material from the located structural defect to another place and cause another short-circuit. In addition, such a radiation treatment is complicated and increases production cost.

Second, when the etching residue or the reaction product which resulted from the formation of the semiconductor layer 14 or the contact layers 18 and 19 is present on the gate insulating film 13 above the gate line 1, an undesired capacitance may be formed by the gate line 1, the gate insulating film 13 and the etching residue or reaction product, and electrically connected to the pixel electrode 5. Such a structural defect, i.e., addition of the undesired capacitance, cannot be repaired after the production of the active matrix substrate 10. Thus, in the worst case, the produced active matrix substrate is treated as a waste product.

Finally, short-circuit may occur between the lead terminals 7 of the gate lines 1, or between the lead terminals 8 of the source lines 2, due to patterning imperfection.

SUMMARY OF THE INVENTION

According to a method for producing an active matrix substrate of the present invention, a structural defect causing a display defect, for example, a short-circuit between a source line and a pixel electrode and addition of an undesired capacitance to the pixel due to patterning imperfection, an etching residue, or the like, can be substantially eliminated.

According to one aspect of the present invention, a method is provided for producing an active matrix substrate including a substrate, a plurality of first lines formed on the substrate to be parallel to each other, an insulating film covering the first lines, a plurality of second lines formed on the substrate extending to cross the first lines with the insulating film interposed therebetween, a plurality of switching elements provided near respective crossings of the first lines and the second lines, and a plurality of pixel electrodes which are arranged in a matrix on the insulating film and which are connected to the switching elements, respectively. The method includes the steps of: forming the first lines on the substrate; forming the insulating film on an entire surface of the substrate to cover the first lines; removing portions of the insulating film; forming the second lines and the pixel electrodes so that gaps are provided between the first lines and the pixel electrodes and/or between the second lines and the pixel electrodes. The step of removing the portions of the insulating film is conducted prior to the step of forming the second lines and the pixel electrodes, and the removed portions of the insulating film are positioned to correspond to the gaps.

In one embodiment of the present invention, the first lines are gate lines while the second lines are source lines.

In another embodiment of the present invention, the switching elements are thin film transistors including gate electrodes, source electrodes, drain electrodes and semiconductor portions; each of the gate electrode is connected to a corresponding one of the gate lines; each of the source electrode is connected to a corresponding one of the source lines; and each of the drain electrodes is connected to a corresponding one of the pixel electrodes. The gate electrodes are formed together with the gate lines while the source electrodes and the drain electrodes are formed together with the source lines. The step of forming the semiconductor portions of the thin film transistors on the insulating film prior to the step of removing the portions of the insulating film is further included, the semiconductor portions being respectively disposed above the gate electrodes.

In still another embodiment of the present invention, the active matrix substrate further includes lead terminals connected to at least one of the first lines and the second lines, and contact holes are formed through the insulating film to reach the lead terminals in the step of removing the portions of the insulating film.

In yet still another embodiment of the present invention, the pixel electrodes are formed not to overlap the removed portions of the insulating film.

According to another aspect of the present invention, a method is provided for producing an active matrix substrate including: a substrate; a plurality of first lines formed on the substrate to be parallel to each other; a gate insulating film covering the first lines; a plurality of second lines formed on the substrate extending to cross the first lines with the gate insulating film interposed therebetween; a plurality of switching elements provided near respective crossings of the first lines and the second lines; an interlayer insulating film covering the gate insulating film, the second lines, and the switching elements; and a plurality of pixel electrodes which are arranged in a matrix on the interlayer insulating film and which are connected to the switching elements, respectively. The method includes the steps of: forming the first lines on the substrate; forming the gate insulating film on an entire surface of the substrate to cover the first lines; removing portions of the gate insulating film; forming the second lines on the gate insulating film; forming the interlayer insulating film on the entire surface of the substrate; and forming the pixel electrodes on the interlayer insulating film. The step of removing the portions of the insulating film is conducted prior to the step of forming the second lines, and the removed portions of the gate insulating film is determined so as not to include portions thereof positioned in regions where the first lines and the switching elements are provided.

In one embodiment of the present invention, the active matrix substrate further includes storage capacitance electrodes provided under the pixel electrodes, each of the storage capacitance electrodes constituting a storage capacitance with a portion of a corresponding one of the pixel electrodes. The storage capacitance electrodes are formed on the substrate together with the first lines. Portions of the gate insulating film positioned in regions where the storage capacitance electrodes are formed are not removed.

In another embodiment of the present invention, the switching elements include gate electrodes, source electrodes, drain electrodes and semiconductor portions, and the gate electrodes are formed together with the first lines while the source electrodes and the drain electrodes are formed together with the second lines. The step of removing the portions of the gate insulating film is conducted prior to the step of forming the second lines, the source electrodes and the drain electrodes.

In still another embodiment of the present invention, the interlayer insulating film has a thickness sufficient for making surfaces of the pixel electrodes substantially flat irrespective of presence/absence of the first lines, the second lines and the switching elements under the pixel electrodes.

In yet still another embodiment of the present invention, the active matrix substrate further includes lead terminals connected at least one of the first lines and the second lines, and contact holes which are formed through to reach the lead terminals.

In still another embodiment of the present invention, the contact holes are formed prior to the step of removing the portions of the gate insulating film.

In still another embodiment of the present invention, the contact holes are formed simultaneously with removing the portions of the gate insulating film.

In still another embodiment of the present invention, the active matrix substrate further includes contact holes which are formed through the interlayer insulating film to reach the drain electrodes prior to the step of forming the pixel electrodes.

According to another aspect of the present invention, an active matrix substrate includes a substrate, a plurality of first lines formed on the substrate to be parallel to each other, an insulating film covering the first lines, a plurality of second lines formed on the substrate extending to cross the first lines with the insulating film interposed therebetween, a plurality of switching elements provided near respective crossings of the first lines and the second lines, and a plurality of pixel electrodes which are arranged in a matrix on the insulating film and which are connected to the switching elements, respectively. Gaps are provided between the first lines and the pixel electrodes and/or between the second lines and the pixel electrodes, and portions of the insulating film corresponding to the gaps are removed.

In one embodiment of the present invention, the first lines are gate lines, and the second lines are source lines.

In another embodiment of the present invention, the pixel electrodes are formed so as not to overlap the removed portions of the insulating film.

In still another embodiment of the present invention, the active matrix substrate further includes storage capacitance electrodes formed under the pixel electrodes, each of the storage capacitance electrodes constituting a storage capacitance with a portion of a corresponding one of the pixel electrodes.

In yet still another embodiment of the present invention, an active matrix substrate further includes lead terminals connected to at least one of the first lines and the second lines. Portions of the insulating film corresponding to the lead terminals are removed to expose at least portions of the lead terminals, thereby contact holes are formed.

According to another aspect of the present invention, an active matrix substrate includes a substrate, a plurality of first lines formed on the substrate to be parallel to each other, a gate insulating film covering the first lines, a plurality of second lines formed on the substrate extending to cross the first lines with the gate insulating film interposed therebetween, a plurality of switching elements provided near respective crossings of the first lines and the second lines, an interlayer insulating film covering the gate insulating film, the second lines, the switching elements, a plurality of pixel electrodes arranged in a matrix on the interlayer insulating film which are connected to the switching elements, respectively and a plurality of storage capacitances provided for the respective pixel electrodes. Portions of the gate insulating film are removed so that the removed portions do not include portions thereof positioned in regions where the first lines, the switching elements, and the storage capacitances are provided.

In one embodiment of the present invention, an active matrix substrate further includes lead terminals connected to at least one of the first lines and the second lines. Portions of the insulating film corresponding to the lead terminals are removed to expose at least portions of the lead terminals, thereby contact holes are formed.

Thus, the invention described herein makes possible the advantages of (1) providing an active matrix substrate which is free from a display defect caused by a structural defect, such as short-circuit or addition of an undesired capacitance to a pixel, thereby improving the display quality and (2) providing a method for producing the active matrix substrate by which the structural defect can be substantially eliminated, thereby enhancing the production yield.

These and other advantages of the present invention will become apparent to those skilled in the art upon reading and understanding the following detailed description with reference to the accompanying figures.

DESCRIPTION OF THE PREFERRED EMBODIMENTS

Figure 1:
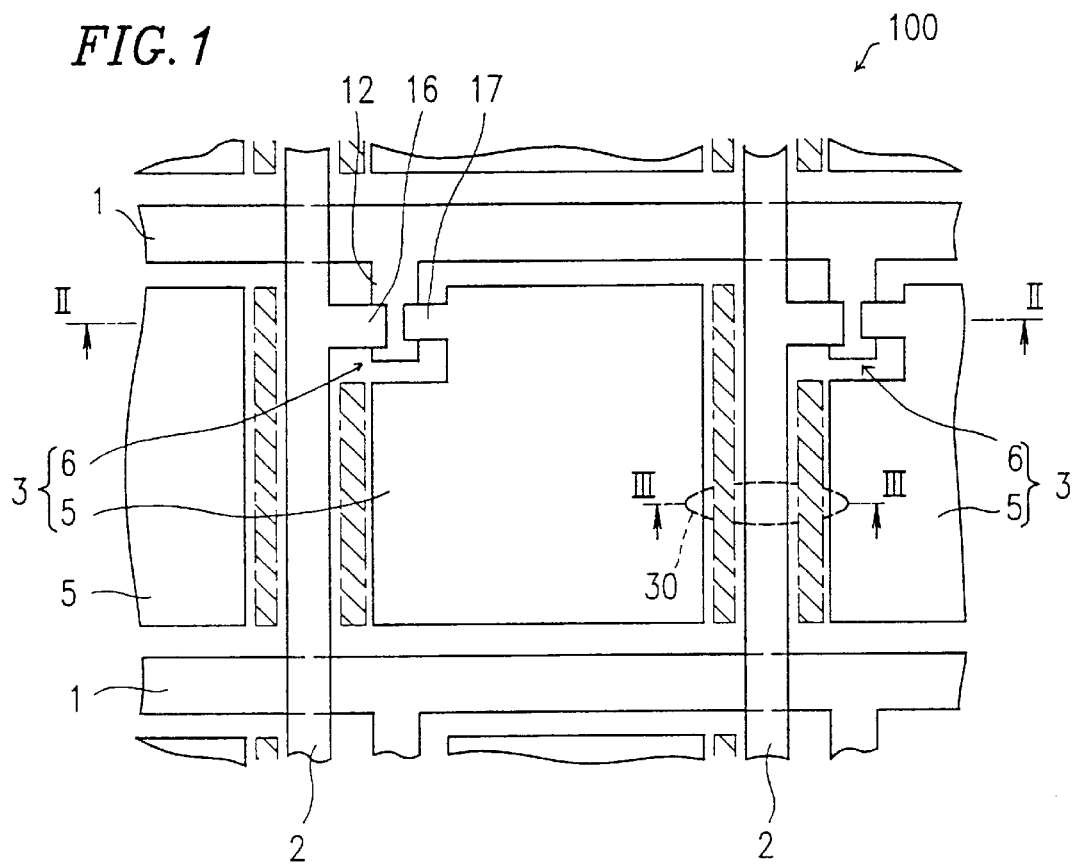
FIG. 1 is a plan view showing a one-pixel portion of an active matrix substrate according to a first example of the present invention.

Hereinafter, the present invention will be described by way of illustrative examples with reference to Figures. Herein, like components are denoted by the same reference numerals.

EXAMPLE 1

Figure 2:
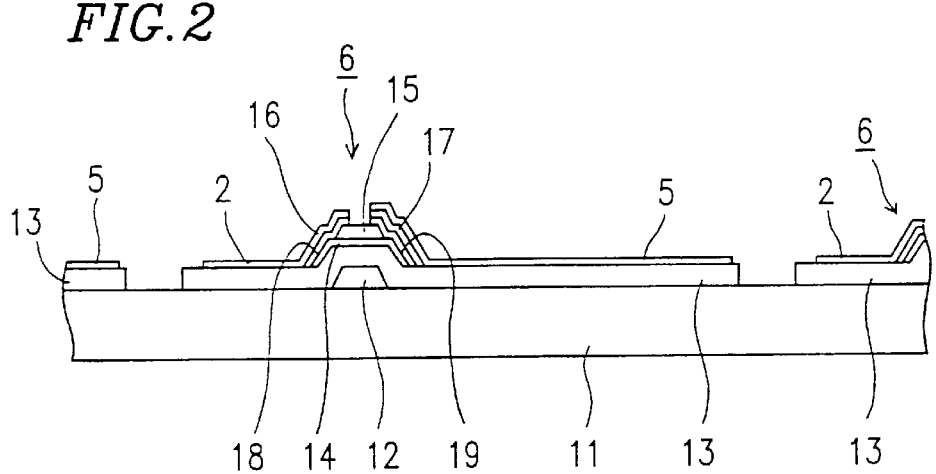
FIG. 2 is a cross-sectional view taken along line II—II of FIG. 1.
Figure 3:
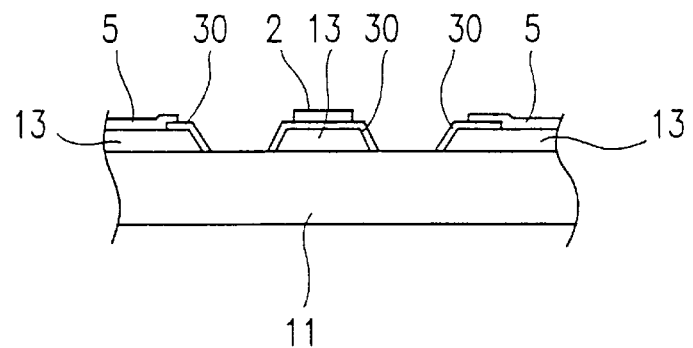
FIG. 3 is a cross-sectional view taken along line III—III of FIG. 1.

FIG. 1 is a plan view showing a one-pixel portion of an active matrix substrate 100 according to a first example of the present invention. FIG. 2 is a cross-sectional view taken along line II—II of FIG. 1. FIG. 3 is a cross-sectional view taken along line III—III of FIG. 1.

The active matrix substrate 100 according to the first example has a similar structure to the above-described conventional active matrix substrate 10. Specifically, referring to FIGS. 1 through 3, the active matrix substrate 100 includes: gate lines 1 as scanning lines; source lines 2 as data lines; pixels 3, each of which includes a pixel electrode 5, and a switching element 6 made of a TFT having a reversed staggered structure; lead terminals (not shown) of the gate lines 1 and the source lines 2. All of the above components are provided on a transparent insulating substrate 11. The switching element (TFT) 6 includes a gate electrode 12, a gate insulating film 13, a semiconductor layer 14, a channel protection layer 15, a source electrode 16, a drain electrode 17, a first contact layer 18 and a second contact layer 19. As shown in FIG. 2, the gate electrodes 12 of the switching element 6 and the gate line 1 are disposed beneath the gate insulting film 13 while the pixel electrode 5 and the source line 2 are disposed above the gate insulating film 13.

The active matrix substrate 100 is different from the conventional active matrix substrate 10 in that the gate insulating film 13 is selectively removed from gaps between the source lines 2 and the pixel electrodes 5. In other words, portions of the gate insulating film 13 which are to correspond to the gaps between the source lines 2 and the pixel electrodes 5 are removed (shown as hatched portions in FIG. 1). Therefore, short-circuit can be prevented from occurring between the source lines 2 and the pixel electrodes 5 even when a conductive material piece remains therebetween due to patterning imperfection or the like, as described later. Accordingly, unlike the conventional active matrix substrate 10, a countermeasure such as laser repair is not required after the production of the active matrix substrate 100.

Hereinafter, an example of a production method of the active matrix substrate 100 will be described.

(1) A layer of a conductive material, which is used for the gate lines 1, the lead terminals thereof (not shown) and the gate electrodes 12 of the switching elements 6, is deposited on the surface of the transparent insulating substrate 11 made, for example, of glass by sputtering. As the conductive material, tantalum, aluminum, molybdenum or an alloy thereof can be used. Then, the conductive film is patterned by a photolithographic method and a dry etching technique so as to form the gate lines 1 parallel to each other, the lead terminals thereof (not shown) and the gate electrodes 12. The gate lines 1 may be formed so that each of them has a plurality of branch portions. In this case, each branch portion serves as the gate electrode 12.

Alternatively, a wet etching technique may be performed after the photolithography. In this case, it is preferable to form a protecting film made, for example, of $Ta_2O_5$ on the transparent insulating substrate 11 prior to formation of the above-mentioned conductive film.

(2) Thereafter, an SiNx layer, an a-Si layer and an SiNx layer are successively provided on the entire surface of the transparent insulating substrate 11 by, for example, a plasma CVD (chemical vapor deposition) method. The lowermost SiNx layer serves as the gate insulating film 13. It is noted that, prior to forming the SiNx layer, a treatment for anodizing the surface of the gate line 1 and the surface of the gate electrode 12 may be performed in order to form anodic oxide films serving as another gate insulator.

(3) The uppermost SiNx layer is patterned to form the channel protection layers 15 of the switching elements 6, so that each channel protection layer 15 is positioned above the corresponding gate electrode 12, as shown in FIG. 2.

(4) Then, either an a-Si($n^+$) layer or a $\mu$c-Si($n^+$) layer is formed on the entire surface of the transparent insulating substrate 11 by a plasma CVD method.

(5) The a-Si($n^+$) layer or the $\mu$c-Si($n^+$) layer (provided in Step (4)) and the a-Si layer (provided in Step (2)) are patterned at the same time so as to form the first and second contact layers 18 and 19 and the semiconductor layer 14, as shown in FIG. 2.

Figure 5:
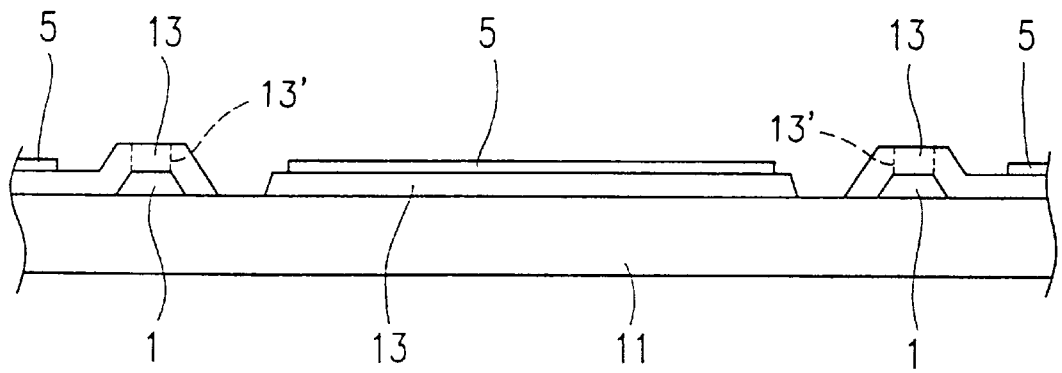
FIG. 5 is a cross-sectional view taken along line V—V of FIG. 4.

(6) In order to expose part of the surface of the lead terminals (not shown) of the gate lines 1, contact holes (see FIG. 5); CH, shown in FIG. 20A–20D are formed through the gate insulating film CH. Thereafter, a driver (not shown) will be connected to the lead terminals of the gate lines 1 via the contact holes 13'.

(7) In regions (shown as hatched regions in FIG. 1) which are to correspond to the gaps provided between the source lines 2 and the pixel electrodes 5 to be formed later, the gate insulating film 13 is selectively etched away. Therefore, even in the case where a conductive material piece, such as an etching residue or a reaction product left in Step (5), adheres to portions of the gate insulating film 13 to be etched away, the adhering conductive material piece is removed together with the portion of the gate insulating film 13. Accordingly, short-circuit between the source lines 2 and the pixel electrodes 5 due to the conductive material piece, such as the etching residues or the reaction products can be avoided.

In order to etch away the etching residue or reaction product left during Step (5), together with the gate insulating film 13, it is preferable to employ a wet etching technique using a mixed solution of hydrofluoric acid and nitric acid or a dry etching technique using $CF_4$ and $O_2$ gases.

(8) Thereafter, a layer of a conductive material, which is used for the source and drain electrodes 16 and 17 of the switching elements 6 and the source lines 2 and the lead terminals thereof, is deposited on the entire surface of the thus-obtained substrate 11 by sputtering. As the conductive material, metal such as titanium, molybdenum, aluminum or an aluminum alloy can be used. Then, the deposited conductive layer is patterned so as to form the source electrodes 16, the drain electrodes 17, the source lines 2 and the lead terminals (not shown) thereof.

(9) Then, an ITO (indium tin oxide) film is deposited on the entire surface of the thus-obtained transparent insulating substrate 11 by sputtering. The ITO film is patterned so as to form the pixel electrodes 5 arranged in a matrix. The ITO film on the source lines 2 may be left to act as a redundancy structure to provide against disconnections of the source lines 2.

(10) Thereafter, a protection film (not shown) made of SiNx is deposited on the entire surface of the thus-obtained transparent insulating substrate 11 by a plasma CVD method. The protection film is patterned to expose only the pixel electrodes 5. Thus, the active matrix substrate 100 is completed.

As described above, according to the above production method, even when a conductive material piece, such as an etching residue or a reaction product which is left unremoved during Step (5), remains in any one of the regions corresponding to the gaps between the source lines 2 and the pixel electrodes 5, the conductive material piece is removed away in Step (7). Therefore, when the source lines 2 and the pixel electrodes 5 are formed in Steps (8) and (9), no structural defect such as short-circuit occurs therebetween. Consequently, unlike the conventional method, there is no need of laser repair after the production of the active matrix substrate 100.

Specifically, in the case where the etching residue remains in a region 30 surrounded by a broken line in FIG. 1, since the etching residue is partially etched away when the gate insulating film 13 in the hatched region is etched away in Step (7), as shown in FIG. 3, no short-circuit occurs between the source line 2 and the pixel electrode 5.

Herein, Step (6) and Step (7) are separately conducted. However, Step (6) and Step (7) can be simultaneously conducted since both steps are directed to patterning the gate insulating film 13. This can be realized by using a suitable etching pattern. By doing so, one production step can be saved and as a result, the number of production steps becomes the same as that of the conventional method.

The present invention is not limited to the above-described method. Various applications and modifications may be contemplated, for example, as described in the following examples.

EXAMPLE 2

Figure 4:
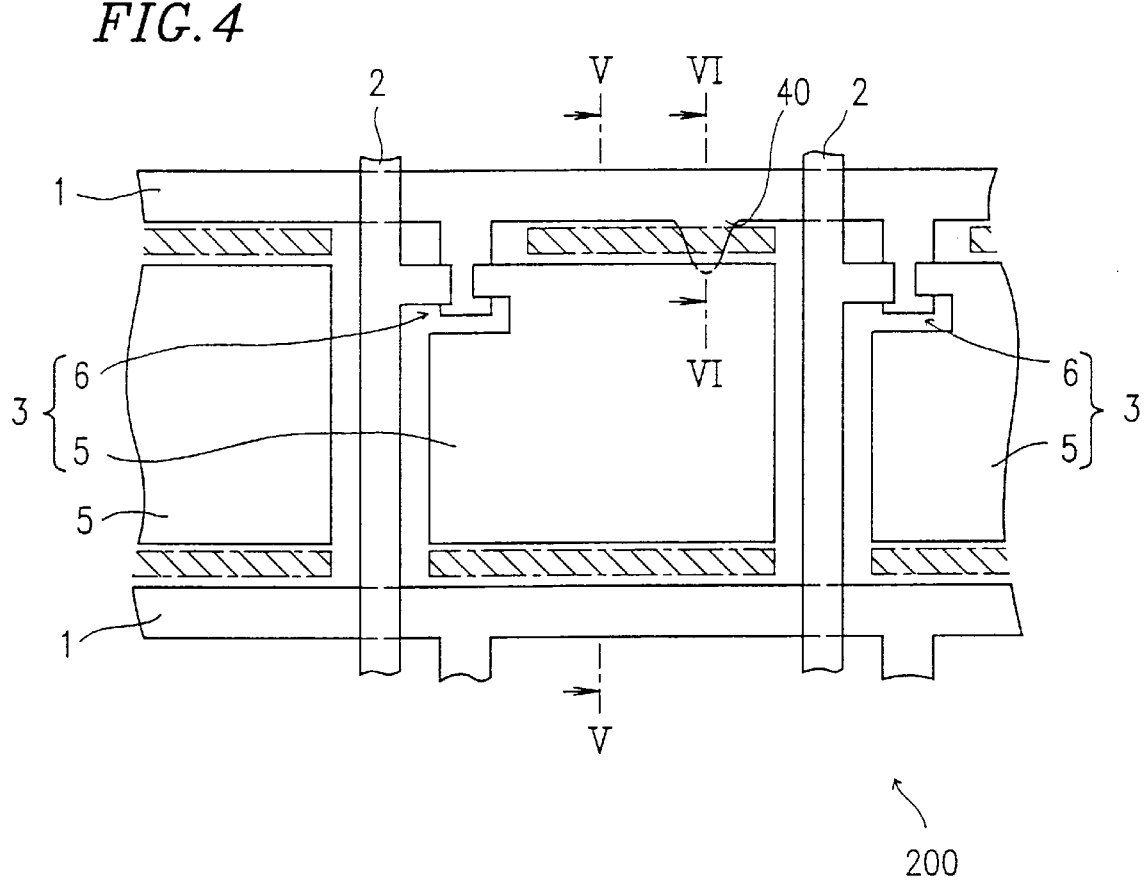
FIG. 4 is a plan view showing a one-pixel portion of an active matrix substrate according to a second example of the present invention.
Figure 6:
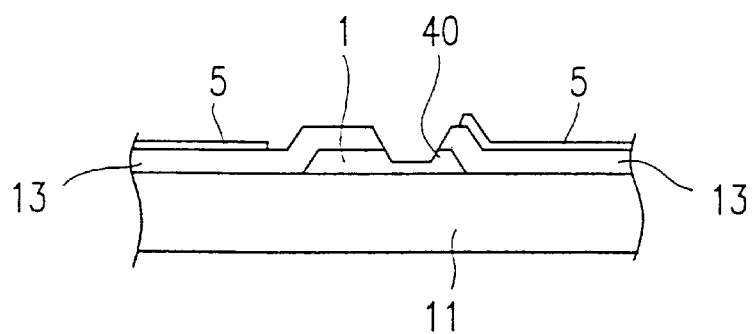
FIG. 6 is a cross-sectional view taken along line VI—VI of FIG. 4.

FIG. 4 is a plan view showing a one-pixel portion of an active matrix substrate 200 according to a second example of the present invention. FIG. 5 is a cross-sectional view taken along line V—V of FIG. 4. FIG. 6 is a cross-sectional view taken along line VI—VI of FIG. 4.

The active matrix substrate 200 according to the second example has a structure similar to the active matrix substrate 100 in the first example and is produced in the manner similar to the first example except for Step (7). Thus, the description of steps other than Step (7) is omitted.

In this example, as shown in FIG. 4, the gate insulating film 13 is selectively removed from regions (shown with hatching in FIG. 4) corresponding to gaps between gate lines 1 and pixel electrodes 5. Accordingly, the following advantageous effects can be achieved. In the case where a conductive material piece, such as an etching residue or a reaction product, is left unremoved on a portion of the gate insulating film 13 above the gate line 1, the conductive material piece may form an undesired capacitance with the gate line 1 and the gate insulating film 13, causing a display defect. However, according to the second example, such an undesired capacitance is not formed because portions of the gate insulating film 13 above the gate lines 1 and portions above which the pixel electrodes 5 are formed, can be separated by removing the hatched portions of the gate insulating film 13. Thus, no structural defect occurs due to the etching residue or the reaction product.

Hereinafter, a case of a patterning imperfection where a patterning remainder 40 of the gate line 1 is left after the patterning will be described with reference to FIG. 6. FIG. 6 is a cross-sectional view also taken along line VI—VI of FIG. 4 in the case where a patterning imperfection took place. In this case, no short-circuit is caused between the patterning remainder 40 and the pixel electrode 5 since the gate insulating film 13 is present therebetween.

Figure 7:
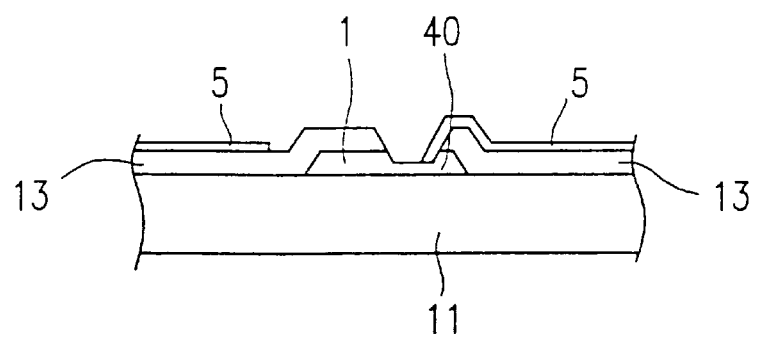
FIG. 7 is a cross-sectional view also taken along line VI—VI of FIG. 4 in the case where a patterning imperfection took place.

However, the regions where the pixel electrodes 5 are to be formed need to be very carefully determined for the following reason. When at least a part of the pixel electrode 5 is formed in the region where the gate insulating film 13 is to be removed (i.e., hatched region shown in FIG. 4), the patterning remainder 40 obtained during Step (1) for forming the gate line 1 is short-circuited with the pixel electrode 5 as shown in FIG. 7. In order to avoid such short-circuit due to the potential patterning imperfection during Step (1), it is preferable to determine the regions where the pixel electrodes 5 are to be formed so that they do not overlap the regions where the gate insulating film 13 is to be removed. Thus, according to the second example of the present invention, the regions where the pixel electrodes 5 are to be formed are determined as shown in FIG. 4. Therefore, as shown in FIG. 6, the pixel electrode 5 is not short-circuited with the patterning remainder 40.

Such a consideration is also applicable to the active matrix substrate 100 according to the first example. In this case, short-circuit between the source line 2 and the pixel electrode 5 can be avoided even when patterning for forming the source lines 2 is imperfect.

EXAMPLE 3

Figure 8:
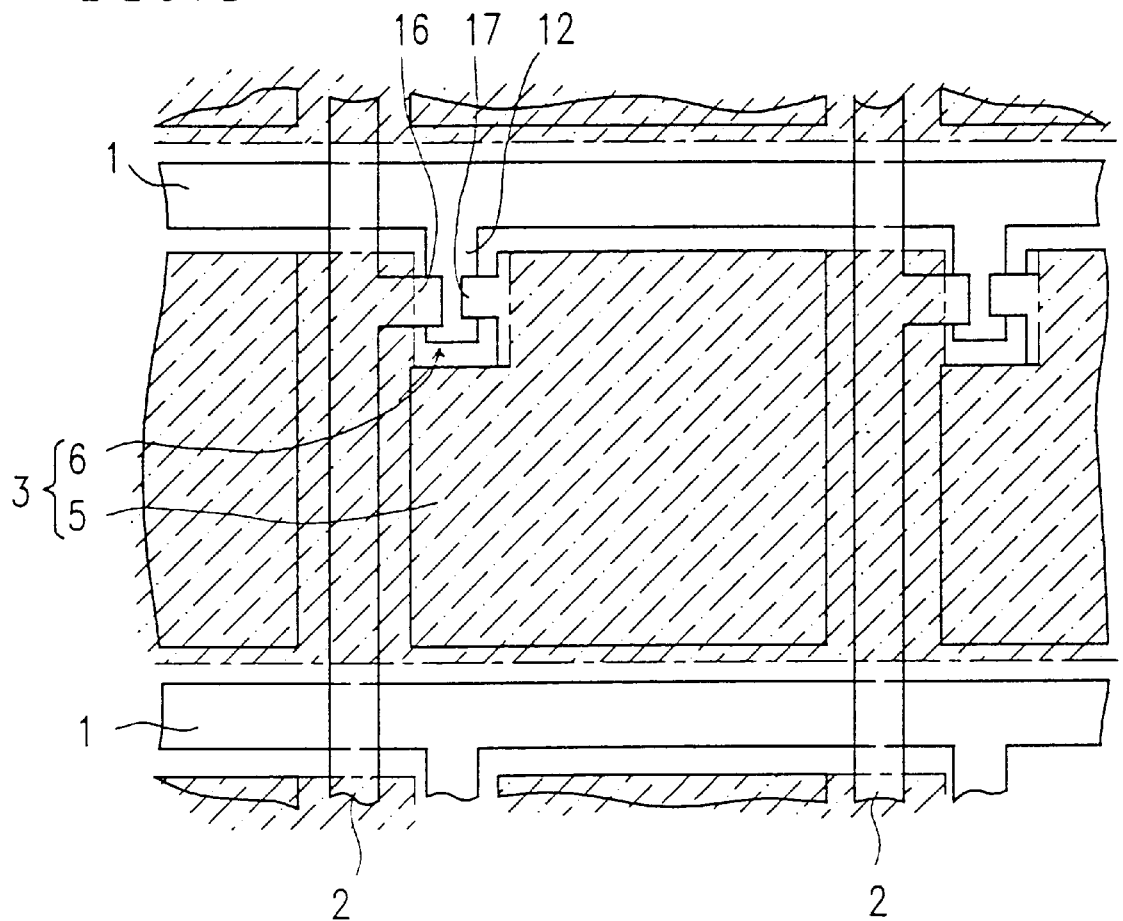
FIG. 8 is a plan view showing a one-pixel portion of an active matrix substrate according to a third example of the present invention.

FIG. 8 is a cross-sectional view showing a one-pixel portion of an active matrix substrate 300 according to a third example of the present invention. FIG. 8 corresponds to FIG. 1. The active matrix substrate 300 has a structure similar to the active matrix substrate 100 of the first example, and is produced in a manner similar to the first example except for Step (7). Thus, the description of the steps other than Step (7) is omitted.

As shown in FIG. 8, according to the third example, the gate insulating film 13 is removed except for portions thereof located in regions which correspond to the gate lines 1 and the switching elements 6. Accordingly, an etching residue or a reaction product, which may adhere to the gate insulating film 13 in any steps performed after the gate insulating film 13 is formed, a larger area can be removed compared to that in the first example.

EXAMPLE 4

Figure 9:
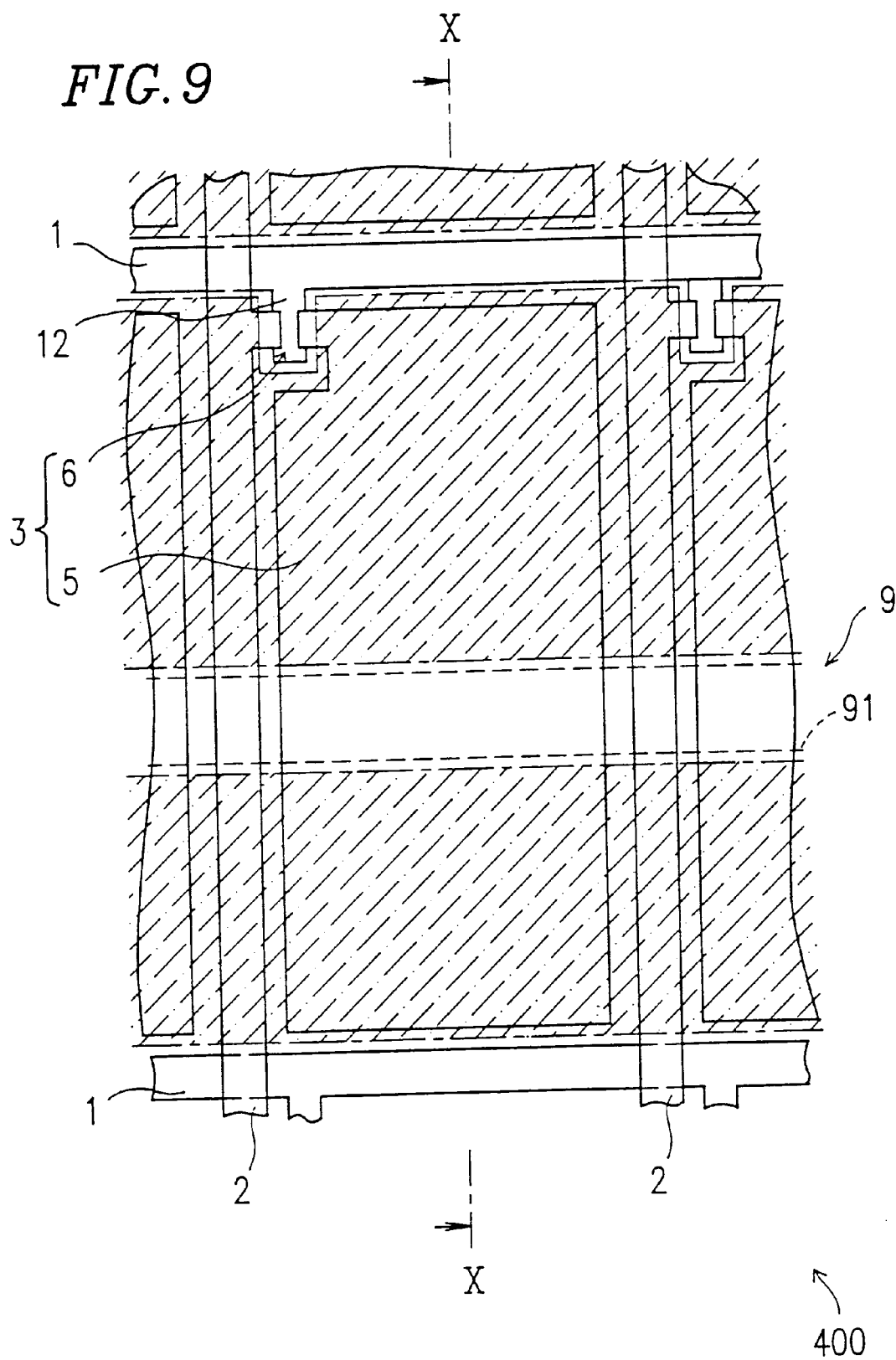
FIG. 9 is a plan view showing a one-pixel portion of an active matrix substrate according to a fourth example of the present invention.
Figure 10:
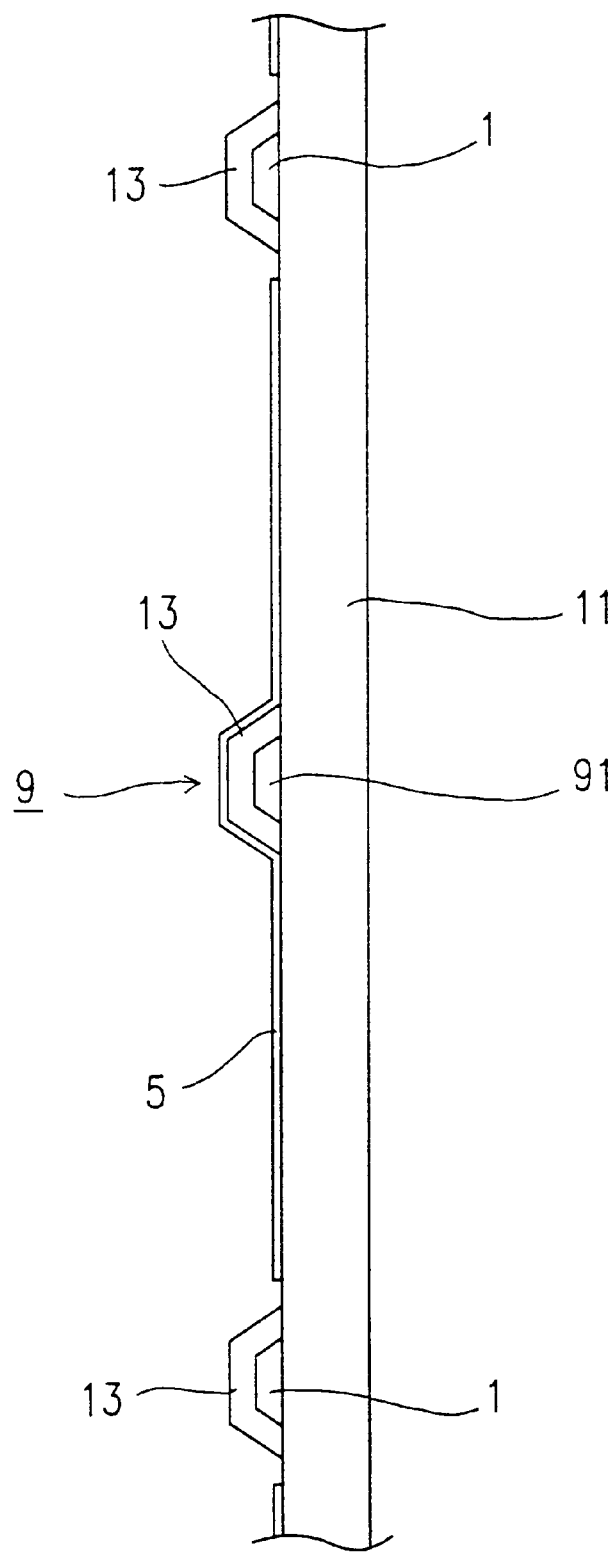
FIG. 10 is a cross-sectional view taken along line X—X of FIG. 9.

FIG. 9 is a cross-sectional view showing a one-pixel portion of an active matrix substrate 400 according to a fourth example. FIG. 10 is a cross-sectional view taken along line X—X of FIG. 9. The active matrix substrate 400 has a structure similar to that of the active matrix substrate 300 described in the third example and further includes storage capacitances 9. Each storage capacitance 9 is provided in one pixel 3 in this example, and is composed of a storage capacitance electrode 91, part of the gate insulating film 13 and part of the pixel electrode 5. The storage capacitance electrode 91 is made simultaneously with the gate lines 1 and the gate electrodes 12 of the switching elements 6 by patterning a same layer of a conductive material.

The active matrix substrate 400 is produced in a manner similar to the active matrix substrate 100 in the first example except that Step (1) is modified to form the storage capacitance electrodes 91 simultaneously with the gate lines 1 and the gate electrodes 12 and that in Step (7), the regions where the gate insulating film 13 is etched away are changed. Specifically, according to the fourth example, the gate insulating film 13 is removed except portions thereof (shown as the hatched portions in FIG. 9) which correspond to the gate lines 1, the switching elements 6 and the storage capacitances 9. Therefore, a larger area of the gate insulating film 13 and a conductive material piece such as an etching residue or a reaction product thereon can be removed as in the third example.

EXAMPLE 5

Figure 11:
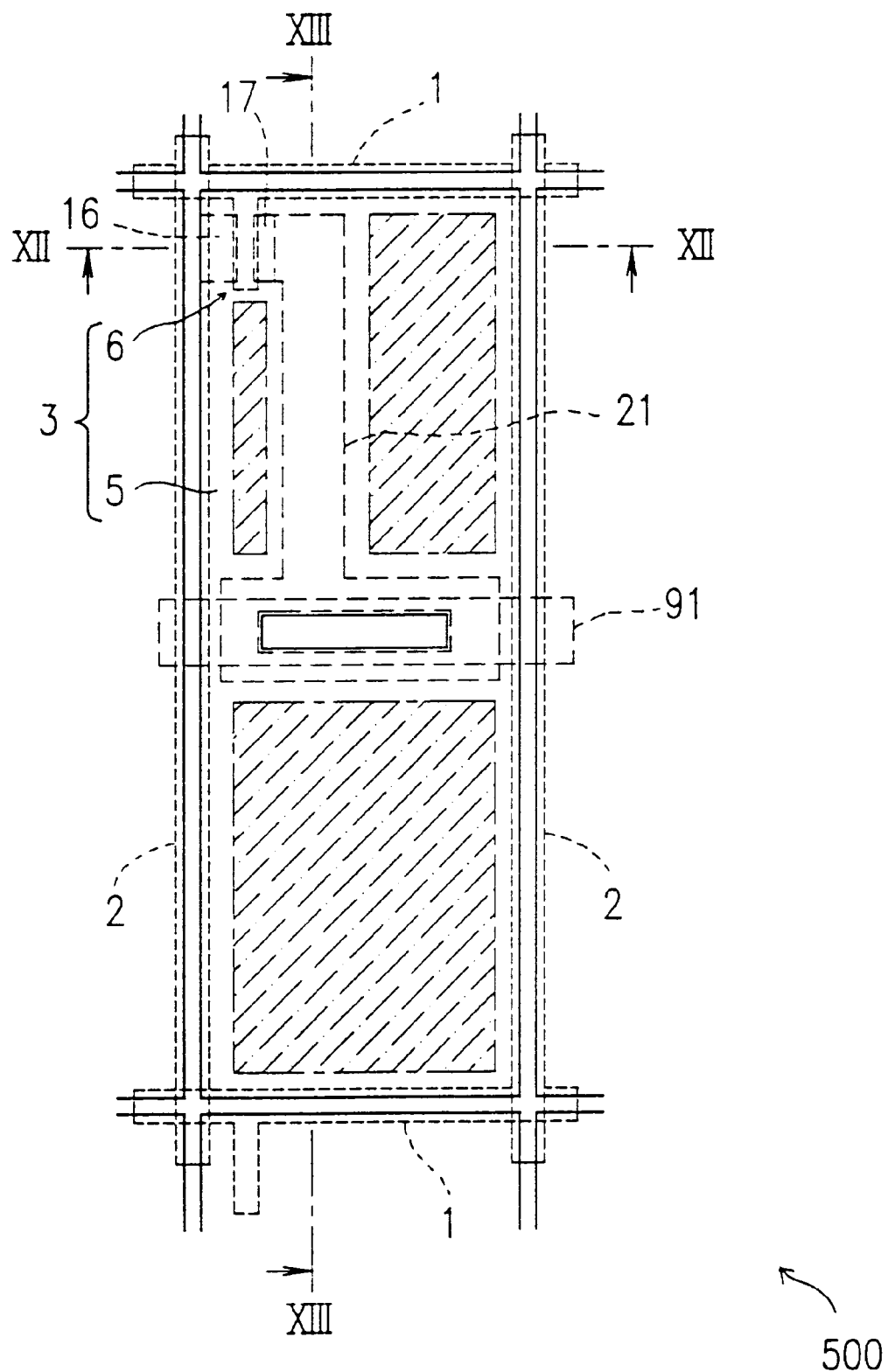
FIG. 11 is a plan view showing a one-pixel portion of an active matrix substrate according to a fifth example of the present invention.
Figure 12:
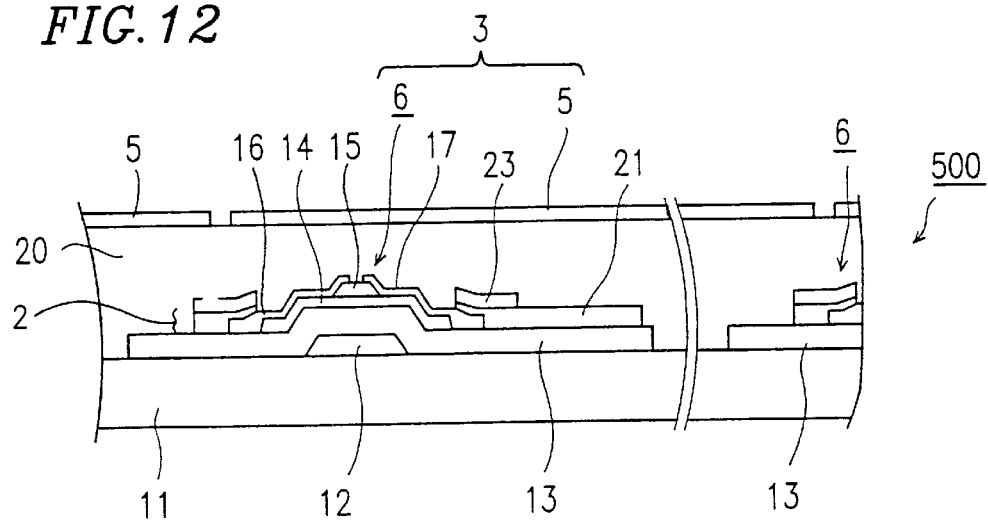
FIG. 12 is a cross-sectional view taken along line XII—XII of FIG. 11.
Figure 13:
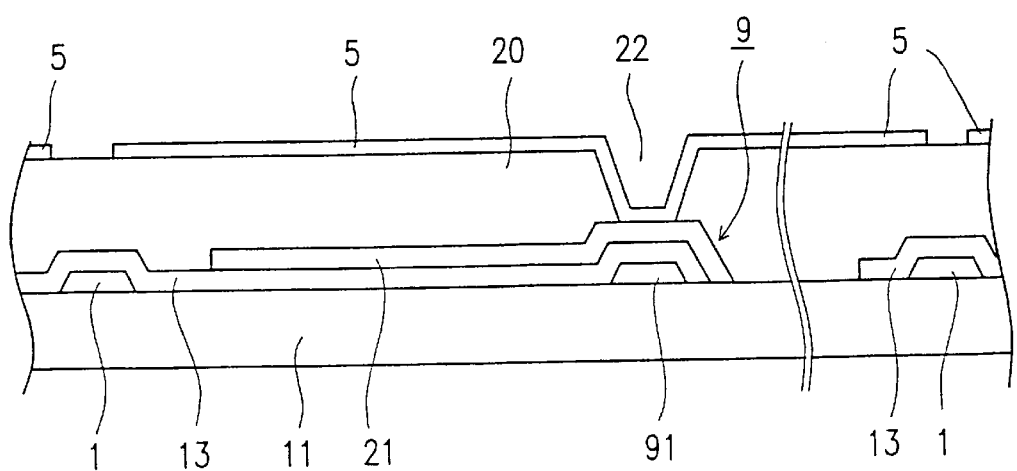
FIG. 13 is a cross-sectional view taken along line XIII—XIII of FIG. 11.

FIG. 11 is a cross-sectional view showing a one-pixel portion of an active matrix substrate 500 according to a fifth example of the present invention. FIG. 12 is a cross-sectional view taken along line XII—XII of FIG. 11. FIG. 13 is a cross-sectional view taken along line XIII—XIII of FIG. 11.

The active matrix substrate 500 differs from the active matrix substrate 100 according to the first example in that each pixel electrode 5 partially overlaps adjacent gate lines 1 and adjacent source lines 2. Accordingly, an aperture ratio and precision thereof are improved in the active matrix substrate 500. In addition, the active matrix substrate 500 includes the storage capacitances 9 provided in the pixels 3, respectively, as in Examples 3 and 4.

Referring to FIGS. 11 through 13, the active matrix substrate 500 further includes an interlayer insulating film 20, a conductive film 21 for connecting the drain electrode 17 to the pixel electrode 5, a contact hole 22 formed through the interlayer insulating film 20 and a portion 23 serving as a part of the drain electrode 17. The interlayer insulating film 20 has a sufficient thickness so that pixel electrode 5 formed thereon can have a substantially flat surface irrespective of the presence/absence of the lines 1 and 2, the switching elements 6 and the like. The storage capacitance 9 is composed of part of the conductive film 21, part of the gate insulating film 13 and part of a storage capacitance electrode 91 which is simultaneously formed with the gate line 1 and the gate electrode 12 by patterning a same layer of a conductive material.

The active matrix substrate 500 having the above-described structure is produced in a similar manner to the first example with slightly different steps and a few increase in the number of steps.

A conductive material, such as an etching residue or a reaction product left in Step (5) is likely to adhere onto a portion of the gate insulating film 13 corresponding to any one of the gaps secured to be provided between the conductive film 21 and the source line 2, resulting in short-circuit between the conductive film 21 and the source line 2. In order to avoid this, according to the fifth example, before the conductive film 21 and the source line 2 are formed, the portions (shown as hatched portions in FIG. 11) of the gate insulating film 13 are removed except those corresponding to regions where the gate lines 1, the switching elements 6 and the storage capacitances 9 are to be formed. Accordingly, even when the etching residue or the reaction product left in Step (5) stay on the gate insulating film 13 so as to be positioned at any one of the gaps between the conductive film 21 and the source lines 2, no short-circuit occurs since most of the etching residue or the reaction product can be removed in the step of removing the shaded portions of the gate insulating film 13. As a result, no structural defect is formed.

In the fifth example of the present invention, the interlayer insulating film 20 is directly formed on the transparent insulating substrate 11 in the regions where the gate insulating film 13 is removed (i.e., the hatched regions in FIG. 11). For example, when the transparent insulating substrate 11 is made of glass and the gate insulating film 13 is made of SiNx as in the first example, and when the interlayer insulating film 20 is made of an inorganic insulating material such as SiO$_2$ obtained by using TEOS (tetra-ethyl-ortho-silicate) or an organic resin (e.g., an acrylic resin, a polyimide, etc.), an adhesive strength between the interlayer insulating film 20 and the transparent insulating substrate 11 may be larger than that between the interlayer insulating film 20 and the gate insulating film 13. In this case, each of the films and layers provided on the transparent insulating substrate 11 hardly peel off from the transparent insulating substrate 11 and thus the reliability of the active matrix substrate 500 is enhanced. Accordingly, as shown in FIG. 11, the larger the area of the interlayer insulating film 20 directly formed on the transparent insulating substrate 11, the more advantageous this method for preventing the layers from separating from the transparent insulating substrate 11.

Moreover, when the number of the films and layers provided on the substrate 11 are increased, an amount of light reflection increases at each interface between the films and layers and a light transmittance tends to decrease. Since a larger area of the gate insulating film 13 is removed in the display regions according to the method described in this example, the larger area in the display regions can be composed of fewer numbers of films and layers provided on the substrate 11. As a result, the amount of light reflection can be reduced and thus the light transmittance can be increased, whereby brightness of the active matrix liquid crystal display device incorporating the active matrix substrate 500 is enhanced.

EXAMPLE 6

Figure 14:
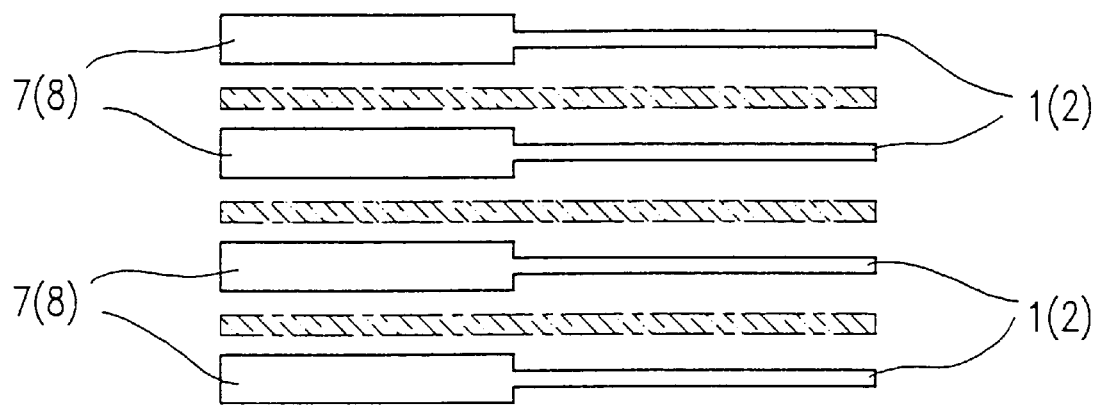
FIG. 14 is a plan view showing lead terminals of gate lines or data lines according to a sixth example of the present invention.

FIG. 14 is a plan view showing the lead terminals 7 of the gate lines 1 or the lead terminals 8 of the source lines 2 of the active matrix substrate described in any one of Examples 1 to 5. The lead terminals 7 of the gate lines 1 are simultaneously formed with the gate lines 1 on the transparent insulating substrate 11. The lead terminals 8 of the source lines 2 are simultaneously formed with the source lines 2 on the gate insulating film 13. The adjacent lead terminals 7 may be short-circuited with each other when patterning for forming the lead terminals 7 is imperfect. As to the lead terminals 8 of the source lines 2, an etching residue or a reaction product left in the previous step of forming the semiconductor layer 14 and the contact layers 18 and 19 may adhere to the gate insulating film 13 to the pounding to the gap between the lead terminals 8, thereby causing short-circuit therebetween. In order to prevent such a structural defect, according to the sixth example, the gate insulating film 13 in regions (shown as hatched regions in FIG. 14) which correspond to the gaps between the adjacent lead terminals 7 and the gaps between the adjacent lead terminals 8 are removed. By doing so, the above-described patterning remainder, etching residue or reaction product can be removed together with the part of the gate insulating film 13. As a result, no structural defect such as short-circuit occurs.

Alternatively, the lead terminals 8 of the source lines 2 may be simultaneously formed on the transparent insulating substrate 11 with the gate electrodes 12 and the lead terminals 7 of the gate lines 1 by patterning a same layer of a conductive material. In this case, it is necessary to form contact holes through the gate insulating film 13 for connecting the later-formed source lines 2 to the lead terminals 8. In this case, potential short-circuit between the adjacent lead terminals 8 due to patterning imperfection can be prevented from occurring.

EXAMPLE 7

Figure 15:
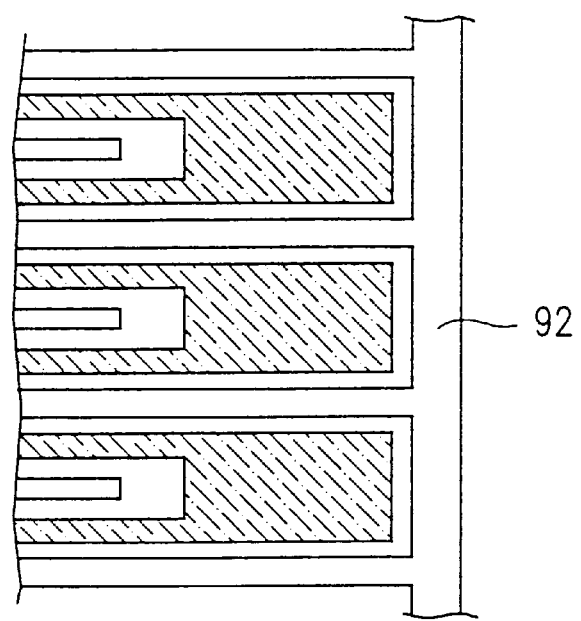
FIG. 15 is a plan view showing a lead wire of a storage capacitor electrode according to a seventh example of the present invention.
Figure 16:
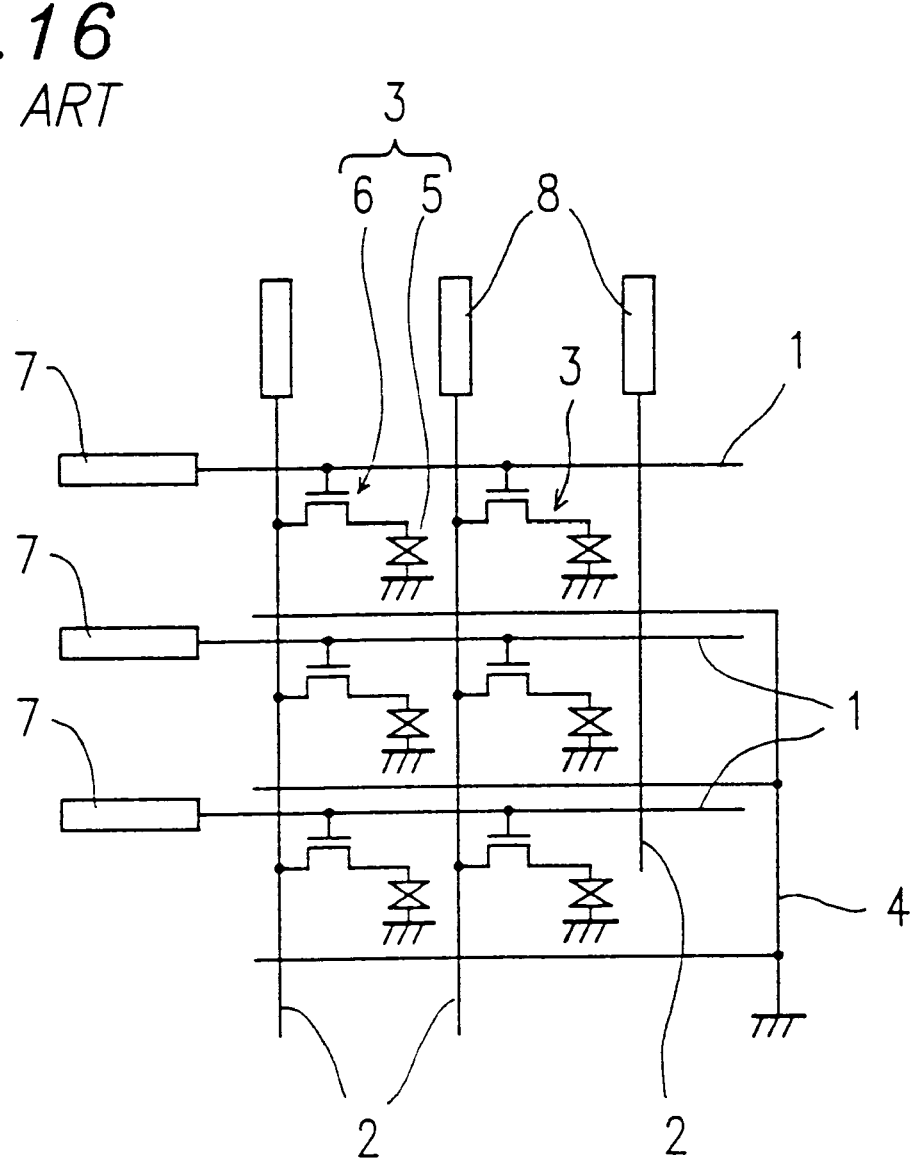
FIG. 16 is a circuit diagram illustrating an exemplary structure of a conventional active matrix liquid crystal display device.
Figure 17:
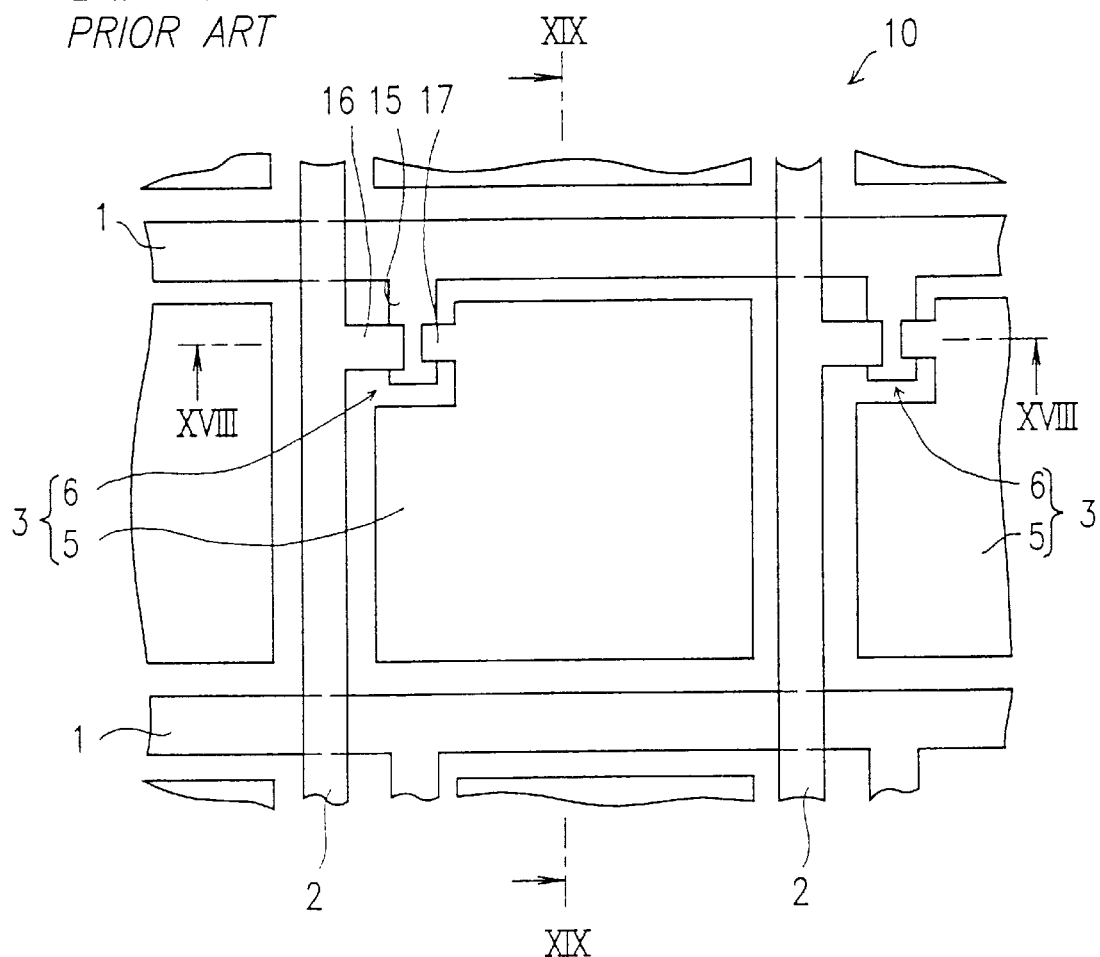
FIG. 17 is a plan view showing a one-pixel portion of a conventional active matrix substrate.
Figure 18:
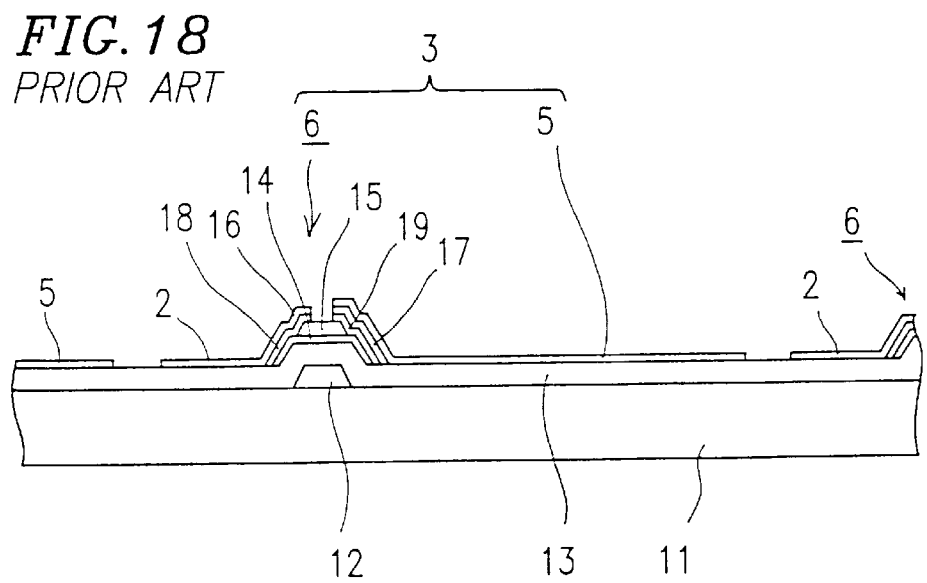
FIG. 18 is a cross-sectional view taken along line XVIII—XVIII of FIG. 17.
Figure 19:
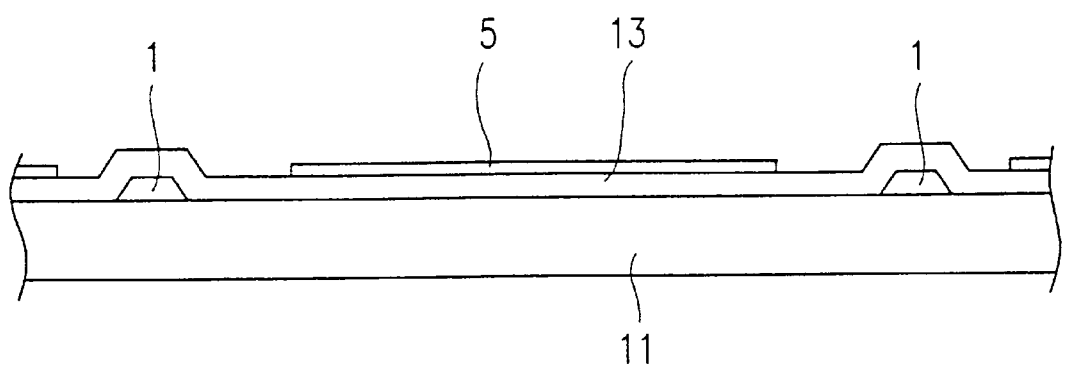
FIG. 19 is a cross-sectional view taken along line XIX—XIX of FIG. 17.
Figure 20A:
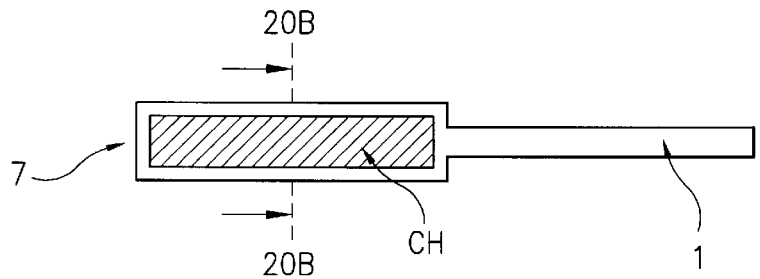
FIG. 20A is a plan view showing a contact hole to reach a lead terminal in the gate line.
Figure 20B:
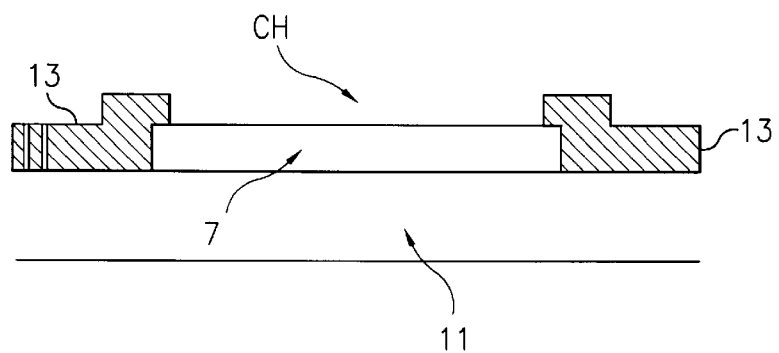
FIG. 20B is a cross-sectional view taken along line 20B—20B in FIG. 20A and along line 20B—20B in FIG. 20C.
Figure 20C:
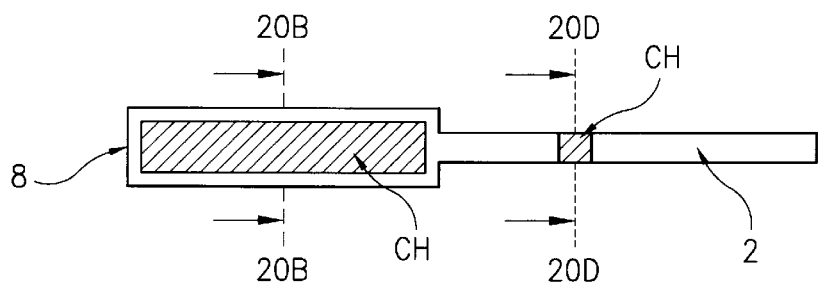
FIG. 20C is a plan view showing a contact hole to reach a lead terminal in the source line.
Figure 20D:
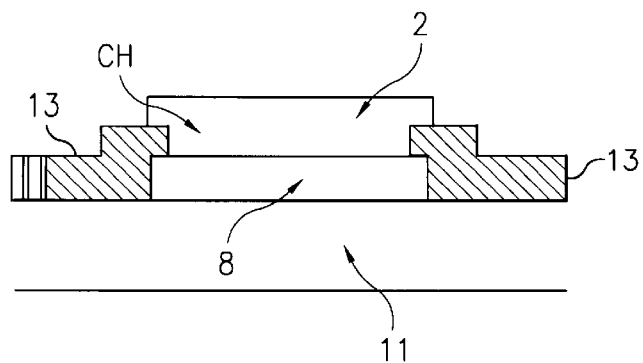
FIG. 20D is a cross-sectional view taken along line 20D—20D in FIG. 20C.

FIG. 15 is a plan view showing a lead wire 92 connected to the storage capacitances 9 shown in FIGS. 9 and 11. The lead wire 92 is formed simultaneously with the gate electrodes 12 by patterning a same layer of a conductive material. The gate insulating film 13 is formed on the above-described structure. In such a structure, adjacent striped portions of the lead wire 92 may be short-circuited with each other due to patterning imperfection. In order to avoid this, according to a seventh example, portions (shown as hatched portions in FIG. 15) of the gate insulating film 13 corresponding to gaps maintained between the adjacent striped portions of the lead wire 92 are removed. Accordingly, even when patterning for forming the lead wire 92 is imperfect, no structural defect occurs since patterning remainders are removed.

As is apparent from the above description, according to present invention, an undesirable pattering remainder obtained when patterning of a layer of a conductive material is imperfect, an etching residue or a reaction product resulting from the etching step of the production process of the active matrix substrate, or the like, can be eliminated within the process. Accordingly, a structural defect, such as short-circuit between a source line and a pixel electrode, or addition of an undesired capacitance, which may be formed on the gate line, to the pixel electrode, can be eliminated. In addition, short-circuit between the adjacent pixel electrodes can also be prevented from occurring. Thus, a high production yield can be achieved.

In a case where the patterning remainder is present so as to be overlapped by the pixel electrode, the patterning remainder is exposed since part of the insulating film is removed. However, according to the present invention, short-circuit does not occur between the pixel electrode and the exposed patterning remainder. More specifically, according to the present invention, the pixel electrode is formed so as not to overlap the removed portion of the insulating film. Therefore, even when the patterning remainder is exposed by removing the portion of the insulating substrate, no short-circuit occurs.

Moreover, the present invention can improve the production yield in a case where the active matrix substrate has a specific structure for achieving a high aperture ratio and high precision where the pixel electrodes are formed to partially overlap adjacent gate lines and adjacent source lines. Also in this case, the undesirable patterning remainder formed when patterning of a conductive layer is imperfect, the etching residue or the reaction product resulting from etching step of the production process, or the like can be removed during producing the active matrix substrate. Accordingly, a structural defect, such as short-circuit between a storage capacitance electrode and a scanning line can be prevented, improving the production yield.

According to the present invention, formation of a contact hole through the insulating film and partial removal of the insulating film may be conducted simultaneously. As a result, the number of production steps is not increased, thereby increasing the production yield without increasing the production cost.

As described above, an active matrix substrate produced by the method of the present invention is free from a structural defect. Also, in an active matrix substrate according to the present invention, no structural defect such as short-circuit occurs between the lead terminals of gate lines or between the lead terminals of source lines. Thus, a display defect caused thereby can be prevented.

Moreover, the active matrix substrate having a structure for achieving a high aperture ratio and high precision includes an interlayer insulating film on an insulating film, formed directly on an insulating substrate at the removed portions of the insulating film. Therefore, by choosing materials such that an adhesive strength between the interlayer insulating film and the insulating substrate is larger than that between the interlayer insulating film and the insulating film, the laminated films on the insulating substrate are hardly separated from each other. Accordingly, the reliability of the active matrix substrate is enhanced.

Additionally, removing the larger area of the insulating film in the display region allows the larger number of the laminated films to be reduced. Accordingly, an amount of light reflection at each interface between the films can be reduced and the light transmittance is improved. As a result, brightness of the active matrix substrate is enhanced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing an active matrix substrate including; a substrate; a plurality of first lines formed on the substrate to be parallel to each other; an insulating film covering the first lines; a plurality of second lines formed on the substrate extending to cross the first lines with the insulating film interposed therebetween; a plurality of switching elements provided near respective crossings of the first lines and the second lines; and a plurality of pixel electrodes arranged in a matrix on the insulating film which are connected to the switching elements, respectively, the method including the steps of:

forming the first lines on the substrate;

forming the insulating film on an entire surface of the substrate to cover the first lines;

removing portions of the insulating film;

forming the second lines;

forming source and drain electrodes of the switching elements;

forming the pixel electrodes so that gaps are provided between the second lines and the pixel electrodes;

wherein the step of removing the portions of the insulating film is conducted prior to the step of forming the second lines and the pixel electrodes, and the removed portions of the insulating film are positioned to correspond to the gaps;

wherein the removed portions of the insulating films overlap with the pixel electrodes and the second lines.

2. A method for producing an active matrix substrate according to claim 1, wherein the first lines are gate lines while the second lines are source lines.

3. A method for producing an active matrix substrate according to claim 2, wherein the switching elements are thin film transistors including gate electrodes, source electrodes, drain electrodes and semiconductor portions; each of the gate electrodes is connected to a corresponding one of the gate lines; each of the source electrodes is connected to a corresponding one of the source lines; and each of the drain electrodes is connected to a corresponding one of the pixel electrodes, wherein the gate electrodes are formed together with the gate lines while the source electrodes are formed together with the source lines, and wherein a step of forming the semiconductor portions of the thin film transistors on the insulating film prior to the step of removing the portions of the insulating film is further included, the semiconductor portions being disposed above the gate electrodes, respectively.

4. A method for producing an active matrix substrate according to claim 1, wherein the active matrix substrate further includes lead terminals connected to at least one of the first lines and the second lines, and contact holes are formed through the insulating film to reach the lead terminals in the step of removing the portions of the insulating film.

5. The method of producing an active matrix substrate according to claim 1, wherein at least some of the removed portions of the insulation film overlap with the pixel electrodes.

6. The method of producing an active matrix substrate according to claim 1, wherein the step of removing the portions of the insulating film is conducted prior to the steps of forming the second lines, forming the source and drain electrodes, and forming the pixel electrodes.

7. A method for producing an active matrix substrate according to claim 1, wherein the pixel electrodes are formed so that the gaps are provided between the first lines and the pixel electrodes and between the second lines and the pixel electrodes.

8. A method for producing an active matrix substrate including: a substrate; a plurality of first lines formed on the substrate to be parallel to each other; a gate insulating film covering the first lines; a plurality of second lines formed on the substrate extending to cross the first lines with the gate insulating film interposed therebetween; a plurality of switching elements provided near respective crossings of the first lines and the second lines; an interlayer insulating film covering the gate insulating film, the second lines, and the switching elements; and a plurality of pixel electrodes arranged in a matrix on the interlayer insulating film which are connected to the switching elements, respectively, the method including the steps of:

forming the first lines on the substrate;

forming gate electrodes of the switching elements on the substrate;

forming the gate insulating film on an entire surface of the substrate to cover the first lines;

removing portions of the gate insulating film;

forming the second lines over the gate insulating film;

forming source and drain electrodes of the switching elements over the gate insulating film;

forming the interlayer insulating film on the entire surface of the substrate; and forming the pixel electrodes on the interlayer insulating film;

wherein the interlayer insulating film is formed to have sufficient thickness such that the pixel electrode formed thereon has a substantially flat surface;

wherein the step of removing the portions of the gate insulating film is conducted prior to the step of forming the second lines, and the removed portions of the gate insulating film is determined so as to be positioned below the pixel electrodes and not to include portions thereof positioned in regions where the first lines and the switching elements are provided.

9. A method for producing an active matrix substrate according to claim 8, wherein the active matrix substrate further includes storage capacitance electrodes provided under the pixel electrodes, each of the storage capacitance electrodes constituting a storage capacitance with a portion of a corresponding one of the pixel electrodes, wherein the storage capacitance electrodes are formed on the substrate together with the first lines, and wherein portions of the gate insulating film positioned in regions where the storage capacitance electrodes are formed are not removed.

10. A method for producing an active matrix substrate according to claim 9, wherein the switching elements include gate electrodes, source electrodes, drain electrodes and semiconductor portions, and the gate electrodes are formed together with the first lines while the source electrodes and the drain electrodes are formed together with the second lines, and wherein the step of removing the portions of the gate insulating film is conducted prior to the step of forming the second lines, the source electrodes and the drain electrodes.

11. A method for producing an active matrix substrate according to claim 8, wherein the interlayer insulating film has a thickness sufficient for making surfaces of the pixel electrodes substantially flat irrespective of presence/absence of the first lines, the second lines and the switching elements under the pixel electrodes.

12. A method for producing an active matrix substrate according to claim 8, wherein the active matrix substrate further includes lead terminals connected at least one of the first lines and the second lines, and contact holes which are formed through the gate insulating film to reach the lead terminals.

13. A method for producing an active matrix substrate according to claim 12, wherein the contact holes are formed prior to the step of removing the portions of the gate insulating film.

14. A method for producing an active matrix substrate according to claim 12, wherein the contact holes are formed simultaneously with removing the portions of the gate insulating film.

15. A method for producing an active matrix substrate according to claim 8, wherein the active matrix substrate further includes contact holes which are formed through the interlayer insulating film to reach the drain electrodes prior to the step of forming the pixel electrodes.

16. The method for producing an active matrix substrate according to claim 8, wherein the step of removing portions of the gate insulating film comprises removing the gate insulating film except in regions where gate lines, switching elements, a conductive film, and storage capacitances are to be formed.

17. The method for producing an active matrix substrate according to claim 8, wherein the interlayer insulating film is formed over regions where the gate insulating film is removed.

18. The method of producing an active matrix substrate according to claim 8, wherein at least some of the removed portion of the insulation film overlap with the pixel electrodes.

19. An active matrix substrate comprising:

a substrate;

a plurality of first lines formed on the substrate to be parallel to each other;

an insulating film covering the first lines;

a plurality of second lines formed on the substrate extending to cross the first lines with the insulating film interposed therebetween;

a plurality of switching elements provided near respective crossings of the first lines and the second lines; and a plurality of pixel electrodes arranged in a matrix on the insulating film which are connected to the switching elements, respectively;

wherein gaps are provided between the second lines and the pixel electrodes;

wherein portions of the insulating film corresponding to the gaps are removed;

and wherein the removed portions of the insulating films overlap with the pixel electrodes and the second lines.

20. An active matrix substrate according to claim 19, wherein the first lines are gate lines, and the second lines are source lines.

21. An active matrix substrate according to claim 19, further comprising storage capacitance electrodes formed under the pixel electrodes, each of the storage capacitance electrodes constituting a storage capacitance with a portion of a corresponding one of the pixel electrodes.

22. An active matrix substrate according to claim 19, further comprising lead terminals connected to at least one of the first lines and the second lines, wherein portions of the insulating film corresponding to the lead terminals are removed to expose at least portions of the lead terminals, thereby contact holes are formed.

23. An active matrix substrate according to claim 19, wherein at least some of the portions of the insulation film corresponding to the gaps overlap with the pixel electrodes.

24. A method for producing an active matrix substrate according to claim 19, wherein the pixel electrodes are formed so that the gaps are provided between the first lines and the pixel electrodes and between the second lines and the pixel electrodes.

25. An active matrix substrate comprising:

a substrate;

a plurality of first lines formed on the substrate to be parallel to each other;

a gate insulating film covering the first lines;

a plurality of second lines formed on the substrate extending to cross the first lines with the gate insulating film interposed therebetween;

a plurality of switching elements provided near respective crossings of the first lines and the second lines;

an interlayer insulating film covering the gate insulating film, the second lines, and the switching elements;

a plurality of pixel electrodes arranged in a matrix on the interlayer insulating film which are connected to the switching elements, respectively, and wherein the interlayer insulating film is formed to have sufficient thickness such that the plurality of pixel electrodes formed thereon have a substantially flat surface;

wherein portions of the gate insulating film are removed away so that the removed portions are positioned below the pixel electrodes and do not include portions thereof positioned in regions where the first lines and the switching elements are provided.

26. An active matrix substrate according to claim 25, further comprising lead terminals connected to at least one of the first lines and the second lines, wherein portions of the gate insulating film corresponding to the lead terminals are removed to expose at least portions of the lead terminals, thereby contact holes are formed.

27. An active matrix substrate according to claim 25, wherein at least some of the removed portions of the gate insulation film overlap with the pixel electrodes.

28. An active matrix substrate according to claim 25, further comprising:

storage capacitance electrodes provided under the respective pixel electrodes, each of the storage capacitance electrodes constituting a storage capacitance with a portion of a corresponding one of the pixel electrodes, wherein the storage capacitance electrodes are formed on the substrate together with the first lines, and wherein portions of the gate insulating film positioned in regions where the storage capacitance electrodes are formed are not removed.

* * * * *